United States Patent [19]
Pearlstein et al.

[11] Patent Number: 6,061,400
[45] Date of Patent: May 9, 2000

[54] METHODS AND APPARATUS FOR DETECTING SCENE CONDITIONS LIKELY TO CAUSE PREDICTION ERRORS IN REDUCED RESOLUTION VIDEO DECODERS AND FOR USING THE DETECTED INFORMATION

[75] Inventors: Larry Pearlstein, Newtown, Pa.; John Henderson, Princeton; Jack Fuhrer, Princeton Junction, both of N.J.

[73] Assignee: Hitachi America Ltd., Tarrytown, N.Y.

[21] Appl. No.: 08/974,907

[22] Filed: Nov. 20, 1997

[51] Int. Cl.$^7$ .............................. H04N 1/66; H04N 7/12
[52] U.S. Cl. ...................... 375/240; 348/391; 348/392; 382/232; 382/239; 382/240
[58] Field of Search ................................ 348/390, 391, 348/392, 397, 402, 565, 566, 567, 568, 423, 424, 416, 555, 556, 407; 382/118, 232, 239, 233, 240; 375/240; H04N 1/66, 7/12

[56] References Cited

U.S. PATENT DOCUMENTS

| | | |
|---|---|---|
| 4,238,773 | 12/1980 | Tsuboka et al. . |
| 4,931,879 | 6/1990 | Koga et al. . |
| 5,091,785 | 2/1992 | Canfield et al. . |
| 5,202,847 | 4/1993 | Bolton et al. . |
| 5,237,460 | 8/1993 | Miller et al. . |
| 5,262,854 | 11/1993 | Ng . |
| 5,313,303 | 5/1994 | Ersoz et al. . |
| 5,325,124 | 6/1994 | Keith . |
| 5,325,125 | 6/1994 | Naimpally et al. . |
| 5,325,126 | 6/1994 | Keith . |
| 5,335,117 | 8/1994 | Park et al. . |
| 5,367,318 | 11/1994 | Beaudin et al. . |
| 5,386,241 | 1/1995 | Park . |
| 5,390,052 | 2/1995 | Kato et al. . |
| 5,398,072 | 3/1995 | Auld . |
| 5,398,079 | 3/1995 | Liu . |
| 5,408,270 | 4/1995 | Lim . |
| 5,422,677 | 6/1995 | Do . |
| 5,444,491 | 8/1995 | Lim . |
| 5,477,397 | 12/1995 | Naimpally et al. . |
| 5,517,245 | 5/1996 | Kondo . |
| 5,526,124 | 6/1996 | Nagasawa . |
| 5,598,222 | 1/1997 | Lane ......................................... 348/568 |
| 5,635,985 | 6/1997 | Boyce et al. ............................ 348/402 |
| 5,646,686 | 7/1997 | Pearlstein ................................ 348/392 |
| 5,708,732 | 1/1998 | Merhav et al. ......................... 382/232 |
| 5,828,421 | 10/1998 | Boyce et al. ............................ 348/565 |
| 5,828,788 | 10/1998 | Chiang et al. .......................... 382/239 |
| 5,852,669 | 12/1998 | Elftheriadis et al. ................... 382/118 |
| 5,969,768 | 10/1999 | Boyce et al. ............................ 348/565 |
| 5,974,185 | 10/1999 | Boyce et al. ............................ 382/239 |

OTHER PUBLICATIONS

A. Hoffman, B. Macq and J.J. Quisquater, "Future Prospects of the Cable TV Networks, New Technologies and New Services", Laboratoire de Telecommunications et Teledetection, pp. 13–22. 1993.

(List continued on next page.)

*Primary Examiner*—Howard Britton
*Assistant Examiner*—Tung Vo
*Attorney, Agent, or Firm*—Straub & Pokotylo; Michael P. Straub

[57] ABSTRACT

Techniques for identifying blocks of pixels, referred to as constant block regions, having approximately the same intensity in terms of luminance values, are discussed. High contrast vertical and/or horizontal edges will cause significant prediction errors in images generated by reduced resolution decoders under certain conditions. Methods for assessing when such conditions exist and a significant prediction error is likely to occur are described. In addition methods and apparatus for minimizing the effect of such prediction errors in downsampling decoders are also described. One specific embodiment is directed to a new video decoder which decodes portions of a single image, e.g., frame, at different resolutions. Areas of the image along high contrast vertical or horizontal edges are decoded at full resolution while other portions of the same image are decoded at reduced resolution. By decoding and storing portions of reduced resolution images at full resolution for reference purposes, the risk of prediction errors resulting from the use of downsampling on reference frames is reduced.

27 Claims, 10 Drawing Sheets

OTHER PUBLICATIONS

International Standards Organization—Moving Picture Experts Group, Draft of Recommendation H.262,ISO/IEC 13818–1 titled "Information Technology—Generic Coding of Moving Pictures and Associated Audio", Nov. 1993.

International Standards Organization—Moving Picture Experts Group, Draft of Recommendation H.262,ISO/IEC 13818–2 titled "Information Technology—Generic Coding of Moving Pictures and Associated Audio", Nov. 1993.

M. Iwahashi et al, "Design of Motion Compensation Filters of Frequency Scaleable Coding—Drift Reduction", pp. 277–280.

A.W. Johnson et al, "Filters for Drift Reduction in Frequency Scaleable Video Coding Schemes", Electronics Letters, vol. 30, No. 6, Mar. 17, 1994.

H. G. Lim et al, "A Low Complexity H.261–Compatible Software Video Decoder", Signal Processing: Image Communication, pp. 25–37, 1996.

R. Mokry and D. Anastassiou, "Minimal Error Drift in Frequency Scalability for Motion–Compensated DCT Coding", IEEE Transactions on Circuits and Systems for Video Technology, Jan. 12, 1994.

Atul Puri and R. Aravind, "Motion–Compensated Video Coding with Adaptive Perceptual Quantization", IEEE Transactions on Circuits and Systems for Video Technology, vol. 1, No. 4, Dec. 1991.

K. R. Rao and P. Yip, "Discrete Cosine Transform—Algorithms, Advantages, Applications", Academic Press, Inc., 1990, pp. 141–143.

006,061,400

METHODS AND APPARATUS FOR DETECTING SCENE CONDITIONS LIKELY TO CAUSE PREDICTION ERRORS IN REDUCED RESOLUTION VIDEO DECODERS AND FOR USING THE DETECTED INFORMATION

FIELD OF THE INVENTION

The present invention relates to methods and apparatus for decoding video data and, more particularly, to methods and apparatus for improving the quality of images generated by reduced resolution video decoders and to new and improved video decoders which produce reduced resolution images from encoded video data.

BACKGROUND OF THE INVENTION

The use of digital signals to transmit video data is becoming ever more common. In order to efficiently transmit video information, data compression is often used.

The International Standards Organization has set a standard referred to as MPEG that is intended to be used for the encoding and transmission of digital video signals such as high definition television (HDTV). One version of the MPEG standard, MPEG-2, is described in the International Standards Organization—Moving Picture Experts Group, Drafts of Recommendation H.262, ISO/IEC 1318-1 and 1318-2 of November 1994.

MPEG-2 and similar encoding systems rely on the use of discrete cosine transform coding and motion compensated prediction techniques, e.g., the use of motion vectors, to reduce the amount of digital data required to represent a series of digital images. Motion compensated prediction involves the use of video data transmitted to represent one frame, e.g., an anchor frame, to reconstruct subsequent, e.g., predicted frames, at decoding time.

Motion vectors are commonly used to implement motion compensated video coding. A motion vector can be used to represent a portion, e.g., a square or rectangular group of pixels, in a predicted frame. A motion vector includes information identifying a group of pixels in a reference frame to be used during video decoding in the generation of a current video frame. A motion vector includes vertical and horizontal offsets, interpreted relative to the position of a current macroblock of video data being decoded. The offsets included in a motion vector identify the pixel data in a reference frame to be used in generating the current frame. In MPEG 2, a macroblock corresponds to a group of 16×16 pixels. In the present application the term "macroblock" is used in a manner that is consistent with its MPEG-2 meaning. The term "block" or the phrase "block of pixels" is intended to refer to any group of pixels and is not intended to be limited to an MPEG-2 block which normally corresponds to a group of 4 pixels.

It is anticipated that at least some video images will be transmitted at resolutions far in excess of those commonly used today for NTSC television broadcasts. Television broadcasts at, e.g., resolutions of 1080×1920 pixels, are often referred to as high definition television signals because they exceed the resolution of current NTSC television images. Television broadcasts involving the transmission of images having a resolution that is the same as or similar to present NTSC television signals are commonly referred to as standard definition television (SDTV) broadcasts.

The amount of data which must be stored and processed for HDTV signals can be considerably greater than that for SDTV signals. Because of the amount of memory and the processing power required to decode HDTV signals in real time, HDTV decoders can be considerably more expensive than SDTV decoders.

The use of reduced resolution video decoders has been suggested in order to allow HDTV video signals to be decoded and displayed using video decoders and display devices which are generally comparable in cost to SDTV decoders. Reduced resolution video decoders, also sometimes referred to as downsampling video decoders, reduce the amount of data used to represent video images thereby also reducing the amount of memory and processing power required to decode an HDTV signal. The decoding of an HDTV signal using a reduced resolution decoder results in the generation of, e.g., SDTV resolution images from an encoded HDTV signal.

Referring now to FIG. 1, there is illustrated a video decoder which is representative of various known reduced resolution video decoders. The reduced resolution video decoder includes an (optional) preparser 112, a syntax parser and variable length decoder circuit 120, an inverse quantization circuit 122, and an inverse DCT circuit 124. The output of the inverse DCT circuit 124 is coupled to the input of a downsampler 126. The downsampler 126 is used to reduce the resolution of the video images being processed and thus the amount of decoded video data which is stored in a video memory 114, e.g., for use as reference frames when generating subsequent frames encoded using motion vectors. In addition to the reference frame memory 114, the video decoder 100 includes a switch 129, summer 128, a pair of motion compensated prediction module 131 and a select/average predictions circuit 134. The motion compensated prediction modules 131 perform uni-directional predictions. In order to form bi-directional predictions, e.g., when processing B-frames, both motion compensated prediction modules 131 are used with the output of the tow modules 131 being combined by the select/average predictions circuit. A single one of the prediction modules 131 is used when performing uni-directions predictions, e.g., when processing P-frames with the select/average predictions circuit 134 selecting the output of the appropriate module 134 to be used. The pixel data generated from reference frame data and output by the select/average predictions circuit 134 is combined by the summer 128 with received decoded video data to generate a complete representation of a video frame which was encoded using motion compensated prediction.

Because HDTV motion vectors are intended to be applied to full HDTV resolution video images and not downsampled video images such as those stored in the memory 114, the motion compensated prediction modules 131 must perform reduced resolution prediction prior to the data being combined by the summer 128, so that the data generated by the motion compensated prediction modules 131 will be of the same reduced resolution as the data output by the downsampler 126.

For a detailed discussion of various reduced resolution video decoders capable of decoding HDTV digital video data see U.S. Pat. No. 5,614,952 which is hereby expressly incorporated by reference.

While reduced resolution video decoders have significant advantages over HDTV decoders in terms of cost, the images generated by such decoders can suffer not only in terms of a reduction in resolution corresponding to the amount of downsampling performed on the HDTV image but also in terms of picture degradation resulting from the use of motion vectors. The use of motion vectors by reduced resolution video decoders offers the potential for serious image degradation in some instances resulting from prediction errors. Such prediction errors are due in large part to the application of motion vectors which were encoded to be used with full resolution reference frames being applied to reduced resolution, e.g., downsampled reference frames.

Thus, the use of known downsampling decoders can lead to certain annoying picture artifacts under particular combinations of scene content and motion vector conditions.

In order to produce decoded video images having a high degree of quality using a reduced resolution decoder, there is a need for methods and apparatus for identifying scene conditions and motion vectors which may result in significant and/or annoying prediction errors and thus degrade image quality. In addition, there is a need for methods and apparatus which can eliminate or minimize the degree of picture degradation resulting from the processing or use of motion vectors by reduced resolution video decoders.

SUMMARY OF THE PRESENT INVENTION

The present invention relates to methods and apparatus for improving the quality of images generated by reduced resolution video decoders and to new and improved video decoders which produce reduced resolution images from encoded video data.

Various features and embodiments of the present invention are directed to identifying conditions within an image which may significantly degrade image quality if particular portions of the image are used by a reduced resolution decoder as reference data. For example, methods and apparatus of the present invention are directed to detecting constant image areas, e.g., blocks of black border pixels, which can produce long high contrast vertical or horizontal edges. Such edges can, in many instances, lead to significant prediction errors if a downsampling decoder uses data located at or near the edges in predictions.

In accordance with one embodiment of the present invention each individual reference frame is examined to detect constant block areas and the edges associated therewith. In such an embodiment, for each reference frame stored in a reduced resolution decoder's frame memory, information relating to the stored reference frame's constant block image areas and/or detected horizontal and/or vertical edges is also stored in memory.

The stored constant block area information is used to assess the risk of prediction errors when making predictions using the corresponding reference frame data. It is also used to identify edges which should be considered for prediction error reduction processing, e.g., in the form of filtering or extrapolation.

In another embodiment, constant block regions which repeatedly occur through a series of frames, e.g., such as black borders used for letterboxing, are detected. The detection process may involve examining only a portion of each frame which is decoded or, in one specific embodiment, the content of only intra-coded frames. Intra-coded frames may be examined for constant block regions since these frames generally require less processing to decode than inter-coded frames making otherwise idle processing resources available for this purpose. Information regarding the detected constant block regions which consistently occur in multiple, e.g., sequential, frames is stored in memory. The stored constant block region information is used for prediction error detection and various processing operations.

In addition to detecting scene conditions, e.g., constant block regions and/or horizontal and vertical edges, in frames used for reference purposes, the present invention is directed to assessing the risk that a large prediction error will occur and that such an error, if it does occur, will result in substantial picture degradation. In one particular embodiment the risk of prediction errors is analyzed on a macroblock by macroblock basis as macroblocks are reconstructed using predictions.

Assessing the risk that a significant prediction error will occur, involves, e.g., motion vector examination, prediction analysis, and optional reconstructed picture analysis.

Macroblocks which are assessed to be at high risk for significant prediction errors, e.g., errors which will cause a noticeable line across the length of a macroblock, are processed to minimize or eliminate the effect of the expected prediction error. Techniques for eliminating prediction errors include extrapolation and edge filtering among others.

One particular embodiment of the present invention is directed to a new and novel video decoder that decodes portions of frames at one, e.g., a reduced, resolution and other portions at increased, e.g., full, resolution along at least one of the two picture sampling axes. In one embodiment, image portions, e.g., constant block regions such as black borders, are identified. Portions of the image at or near a border, e.g., a horizontal or vertical edge, of a constant block region, e.g., within several pixel lines of a vertical or horizontal edge, are decoded and stored for reference purposes at increased resolution along the sampling axis that is perpendicular to the edge. The remaining portion of the image is decoded at a reduced resolution via the application of, e.g., downsampling. Once constant block regions are identified within a series of frames, pixels within the detected constant image regions which are not immediately adjacent the border of the region, in some embodiments, are downsampled more than other portions of the image being decoded. This technique of downsampling constant block areas more than other areas further reduces the amount of data used to represent the frame that is being decoded. This, in turn, helps offset the increased memory requirements associated with decoding some portions of the image at a higher resolution than other portions.

The decoder of the present invention which decodes some portions of a frame at a higher resolution than others can be described as a hybrid downsampling decoder.

Numerous additional features and advantages of the decoding methods and apparatus of the present invention are discussed in the detailed description which follows.

DETAILED DESCRIPTION

Figure 1:
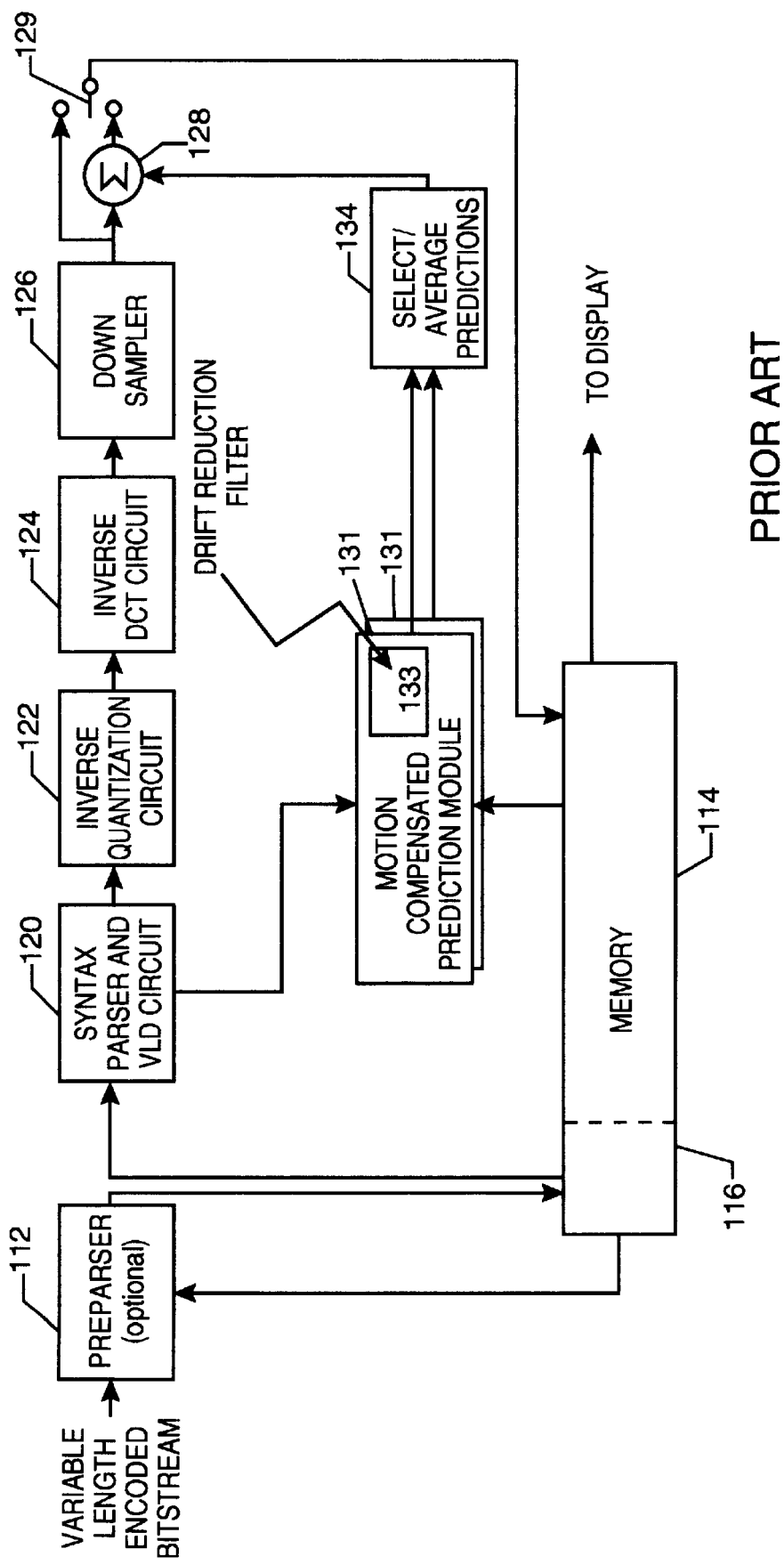
FIG. 1 illustrates a known reduced resolution video decoder.

As discussed above, the present invention is directed to methods and apparatus for improving the picture quality of video images generated using a reduced resolution video decoder and to new and improved reduced resolution video decoders.

In particular, various features and embodiments of the present invention are directed to identifying conditions within an image which may significantly degrade image quality if particular portions of the image are used by a reduced resolution decoder as reference data. Other features and embodiments of the present invention are directed to methods and apparatus for determining when significant prediction errors will, in fact, occur during a reduced resolution decoding operation. Other features and embodiments of the present invention are directed to reducing the degree of picture degradation resulting from the use of motion vectors in downsampling video decoders.

Additional features and embodiments of the present invention are directed to new and novel video decoders which operate as a hybrid between conventional full resolution video decoders and reduced resolution video decoders. The hybrid decoder of the present invention performs high resolution decoding and pixel data storage on certain portions of a video image while applying data reduction operations such as downsampling on other image portions to reduce the amount of data required to represent these other image portions. By performing downsampling on the majority of an image while preserving the resolution of the relatively small image portions which may result in significant prediction errors if downsampled, significant processing and memory savings can be achieved as compared to full resolution video decoders while minimizing the effect of prediction errors resulting from the use of downsampled reference frame data.

It has been discovered that video images which include long vertical or horizontal high contrast edges that are unaligned with the reduced resolution, e.g., downsampling, grid applied by a reduced resolution decoder constitute problematic scene conditions when such scene conditions occur in conjunction with the use of motion vectors. In particular, when 1) high contrast vertical and/or horizontal edge scene conditions exist and 2) when motion vectors which require use of pixel data on or immediately adjacent to a high contrast vertical or horizontal edge are not integer multiples of the downsampling factor, a large and highly noticeable degradation in the reduced resolution image generated by a reduced resolution decoder through the use of the motion vectors can result. The mentioned reduced resolution image degradation is due to significant errors in constructing predictions from reduced resolution reference data using motion vectors which were encoded for use with full resolution reference data.

Black borders comprising one or more rows of horizontal and/or vertical pixels constitute a common source of long horizontal or vertical high contrast edges. Such borders and the resulting long, e.g., row or column length, vertical and/or horizontal, high contrast edges are frequently found in a variety of common video sequences. Letterbox format video presentations, e.g., of movies, are an example of video sequences which include black borders which can result in significant prediction errors if processed by the known reduced resolution video decoder.

It is observed that high contrast vertical and/or horizontal edges frequently occur in images where a portion of the image is represented using pixels having consistent data values, e.g., luminance values which do not vary significantly from pixel to pixel. For example, in the case of black borders, all the pixels of the border may have luminance values below 24.

Figure 2:
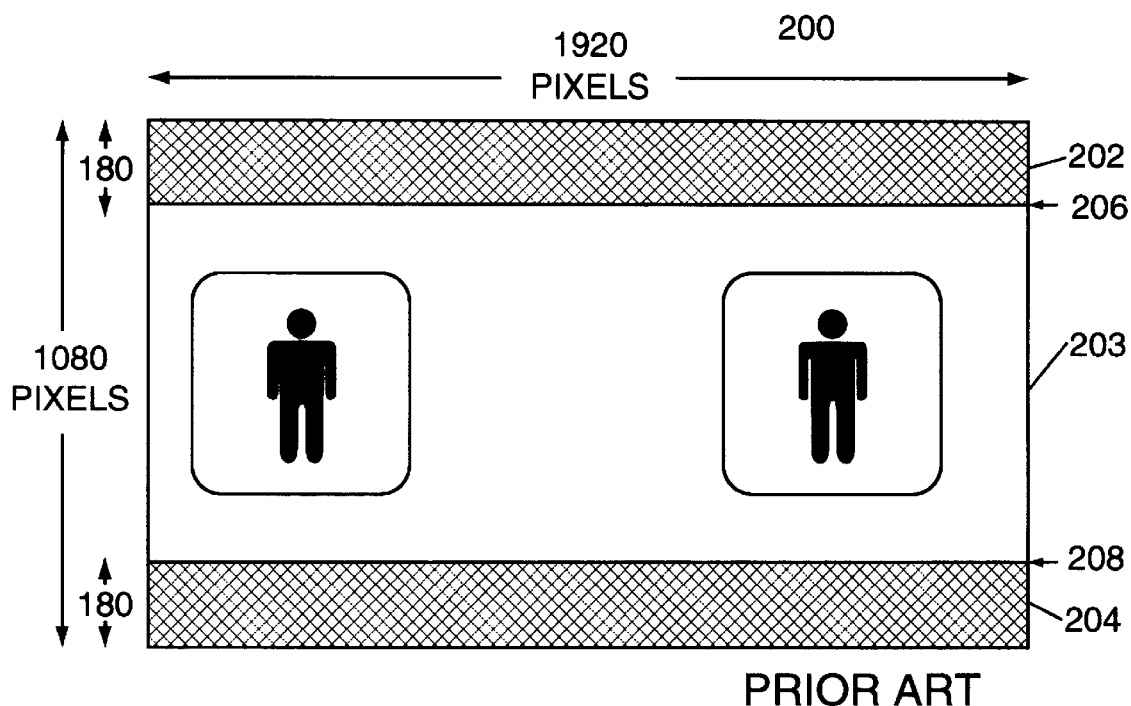
FIG. 2 illustrates an HDTV frame in letterbox format.

FIG. 2 illustrates an HDTV image 200 represented in letterbox format. This format is commonly used in presenting movies which customarily have width to height aspect ratios exceeding that of current NTSC and HDTV formats.

As illustrated in FIG. 2, an HDTV frame presented in letterbox format normally comprises an upper and a lower black border 202, 204. Between the upper and lower borders 202, 204 the picture content is displayed in region 203. The regions 202, 204 represent constant image regions where all the pixels have extremely low luminance values, e.g., 16 assuming that the regions 202, 204 are completely black.

The long horizontal edges 206, 208 between the black border regions 202, 204 and image region 203 will normally be a high contrast edge. Such horizontal high contrast edges represent scene conditions that can cause significant picture degradation. In particular significant prediction errors can occur when motion vectors which reference pixels bordering the high contrast horizontal edge regions 202, 204 are processed by a reduced resolution video decoder.

While intentional black borders 202, 204 are added to frames displayed in letterbox format, it has been discovered that unintentional black borders of, e.g., 1 to 3 pixels in width, are frequently added to encoded digital video frames. Such thin unintentional black borders are usually not significant or noticeable when casually viewing full resolution images with the naked eye. Unfortunately, however, the horizontal and/or vertical high contrast edges associated with such thin borders can lead to significant and often annoying prediction errors when encoded full resolution images with such borders are decoded by a reduced resolution video decoder.

In a movie or other video sequence encoded to be displayed in letterbox format, or which has been unintentionally encoded with a thin black border, the pixel values in the black border regions will normally remain unchanged or almost unchanged for many hundreds or even thousands of sequential frames. Accordingly, such regions 202, 204 and the high contrast edges 206, 208 will normally be present and unchanged over a period of many multiple frames. This fact allows the constant image regions 202, 204 and edges 206, 208 to be identified by processing multiple frames, as opposed to a single frame, if desired. Additionally, movies encoded using a letterbox format may include explicit or implicit information regarding the existence and optionally the location of the constant intensity border regions. This information may be used to assist in the identification of constant image regions.

Figure 3:
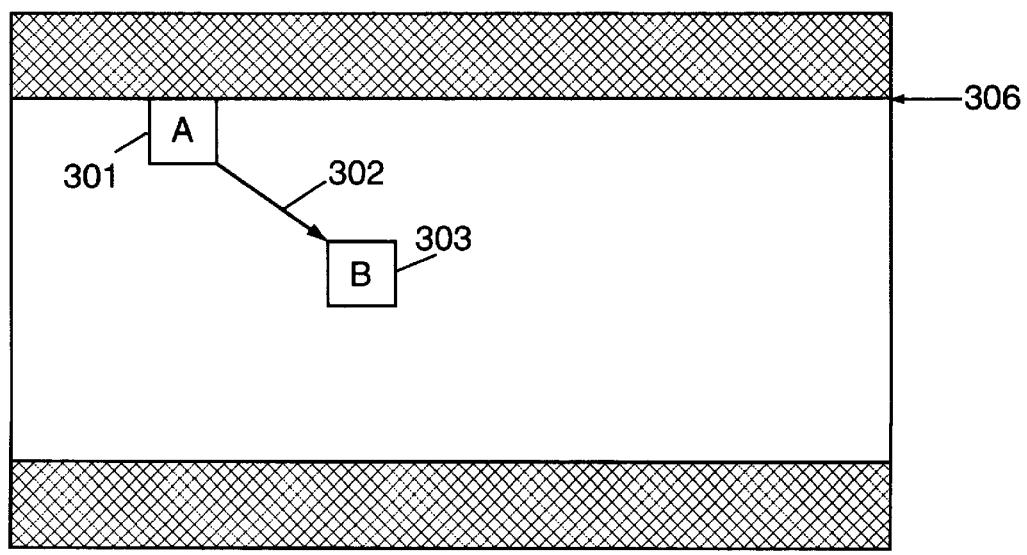
FIG. 3 illustrates the use of a motion vector to encode a video image.

Referring now to FIG. 3, the use of a motion vector, represented by arrow 302, to encode a portion of a high definition letterbox format frame is illustrated. Motion vector 302 is used to indicate that block B 303 can be generated at decoding time using pixels of block A 301 obtained from a reference frame, e.g., a fully intra-coded frame. Note that block A 301 is located adjacent the horizontal high contrast border 306.

Performing a full resolution decoding operation on the image encoded using the motion vector 302 will result in a decoded image of satisfactory quality without the occurrence of a significant prediction error. However, this may not be the case if the same encoded frame is decoded using a reduced resolution video decoder.

Figure 4:
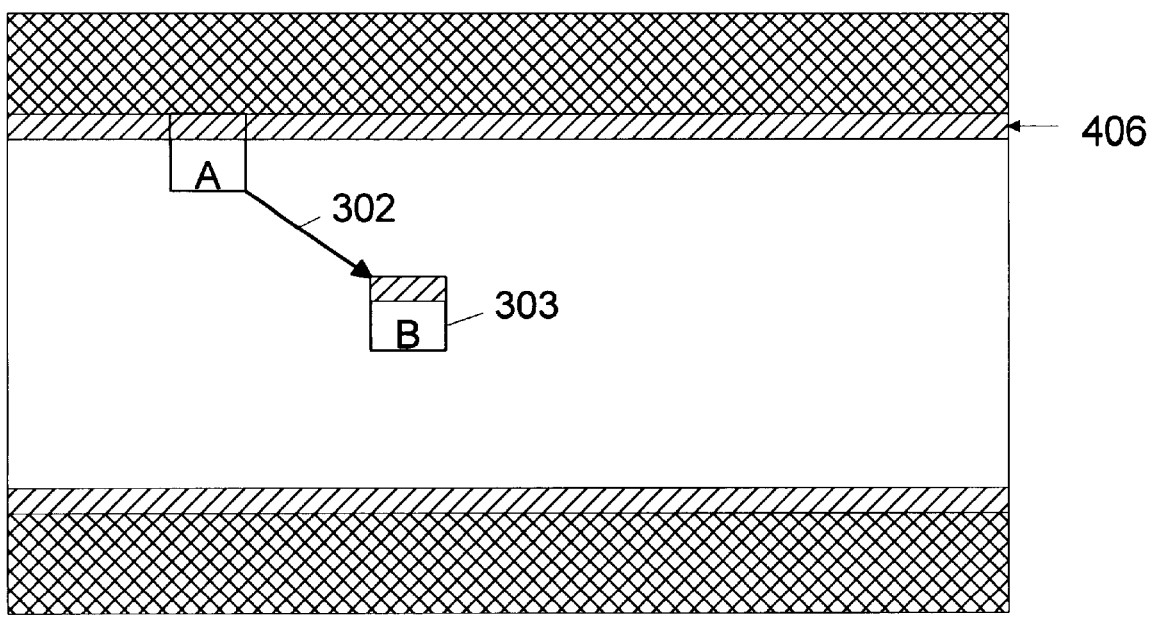
FIG. 4 illustrates picture degradation that can result when a downsampling decoder is used to decode an image which was encoded using a motion vector.

Assuming that the downsampling grid used in decoding the anchor frame referenced by motion vector 302 is not aligned with the horizontal edge 306, a blurring of the edge 306 will occur. Referring now to FIG. 4, it can be seen that the downsampling operation may produce a gray row of pixels 406 in the reduced resolution image corresponding to the previous location of the horizontal edge 306 found in the full resolution anchor frame. The gray row of pixels 406 represents the downsampled row of pixels generated by downsampling at least one row of black pixels of the full resolution reference frame above the horizontal edge 306 with at least one row of brighter, e.g., white, pixels located below the horizontal edge 306.

Note that in the case of the FIG. 4 example, when the motion vector is used by a reduced resolution decoder to construct a predicted frame, from the downsampled reference frame, a serious prediction error results. That is, a row of darker pixels is now positioned at the top of block B instead of the white pixels that should have been located there. The row of darker pixels found in the horizontal straight line which proceeds across the full top length of block B is a prediction error that was introduced into block B as a result of downsampling of the reference frame. This prediction error is particularly noticeable and, to most viewers, annoying.

Figure 5:
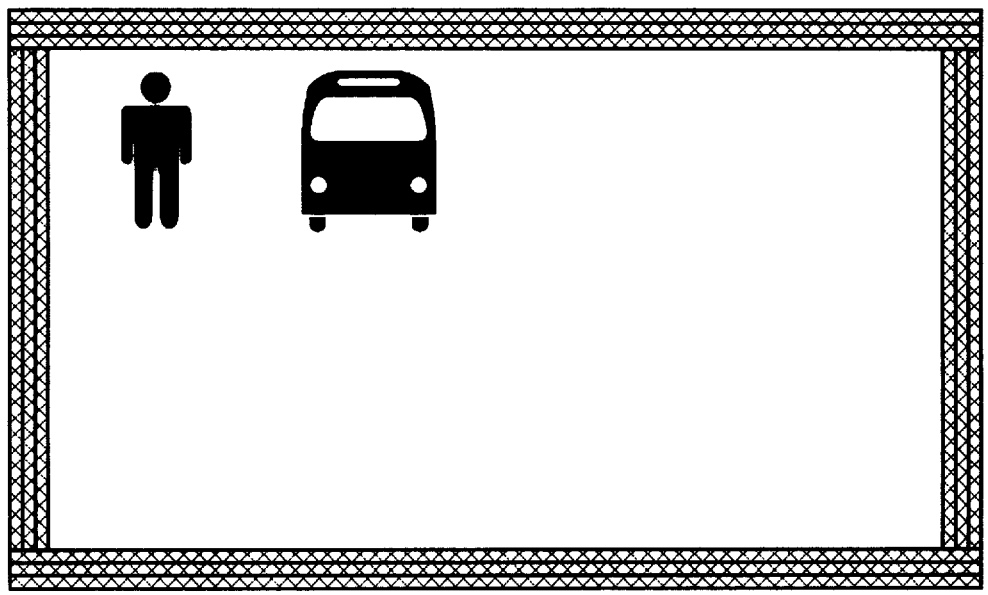
FIG. 5 illustrates a first HDTV frame.
Figure 6:
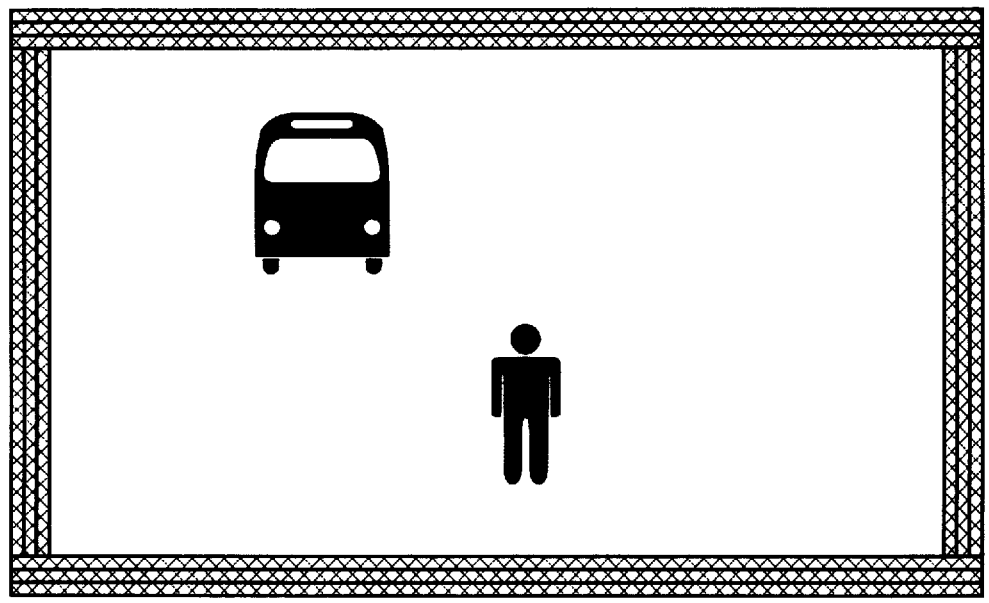
FIG. 6 illustrates a second HDTV frame.

As discussed above, black borders in the form of, e.g., 1–3 rows of black pixels, can be found in many video frames. FIG. 5 illustrates a video frame with a 3 pixel wide border of black pixels represented by the crosshatched portions of the frame 500. FIG. 6 illustrates a frame 600 which follows frame 500 in a video sequence. Note that the difference between frames 5 and 6 involves the moving of the image of the man to a lower center portion of the frame 600 from its original position in the upper left hand corner position of frame 500.

Figure 7:
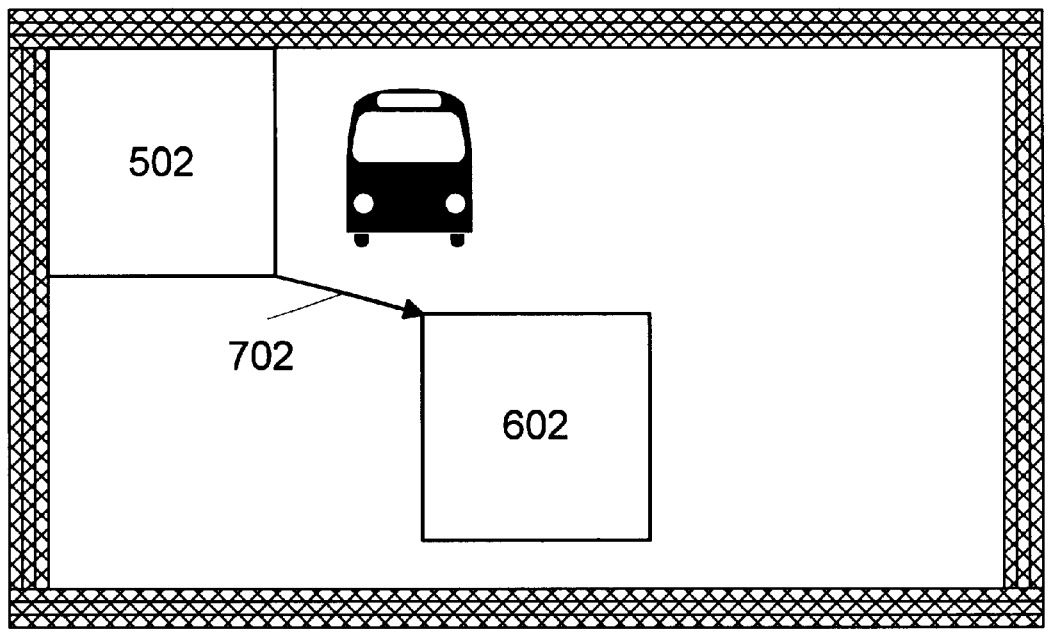
FIG. 7 illustrates how the second HDTV frame illustrated in FIG. 6 can be encoded as a function of the first HDTV frame illustrated in FIG. 5 through the use of a motion vector.

FIG. 7 illustrates how the frame 600 of FIG. 6 can be coded using a motion vector 702 and a block of pixels 502 obtained from the upper left hand corner of the reference frame 500 which is used as a reference frame for coding purposes. Note that the block of pixels 502 does not include any pixels from the 3 pixel wide black border of the frame 500. By using the pixels 502 obtained from the reference frame, the block of pixels 602 can be accurately constructed during decoding using the reference frame 500 and the motion vector 702.

Figure 8:
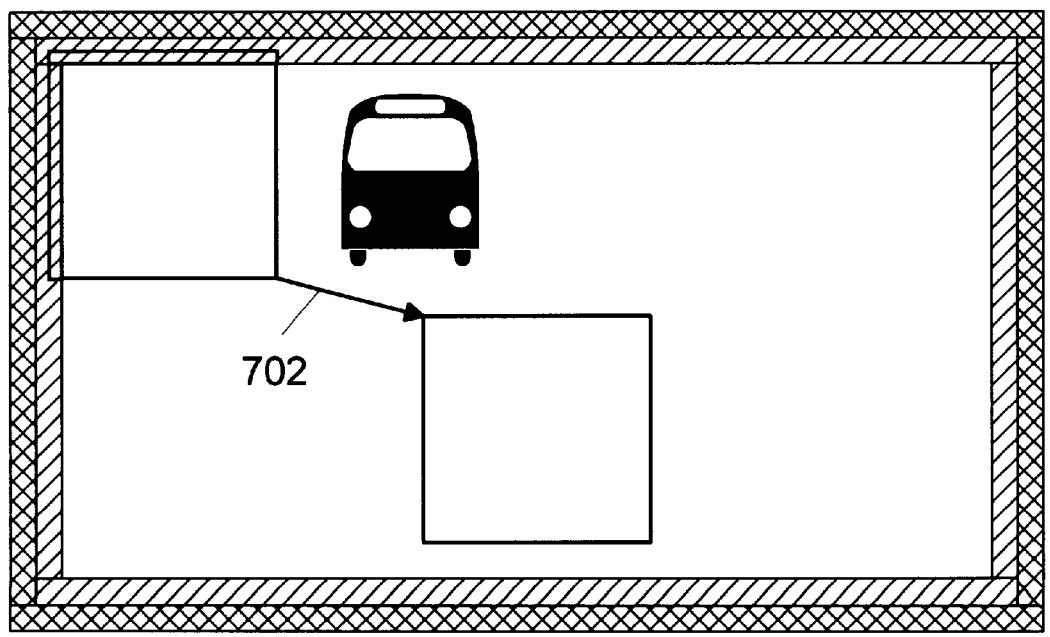
FIG. 8 illustrates the application of the motion vector illustrated in FIG. 7, to a reduced resolution reference frame.

FIG. 8 illustrates the application of the motion vector 702 to a reference frame generated by a reduced resolution decoder which performs downsampling by a factor of two in the horizontal and vertical directions and then applies full resolution motion vectors thereto. The downsampling by a factor of two results in the first and second black border rows of pixels illustrated in FIG. 5 being combined into a single row prior to storage in a frame memory. In addition, it also results in the third inner border row of black pixels being combined with the fourth inner border row of white pixels. Thus, the downsampling operation results in a reference frame having half the resolution of the original reference frame, an outer border row of black pixels, and an inner border row of gray pixels. It is this downsampled reduced resolution reference frame that is stored in the known downsampling decoder systems to be used for reference purposes.

Figure 9:
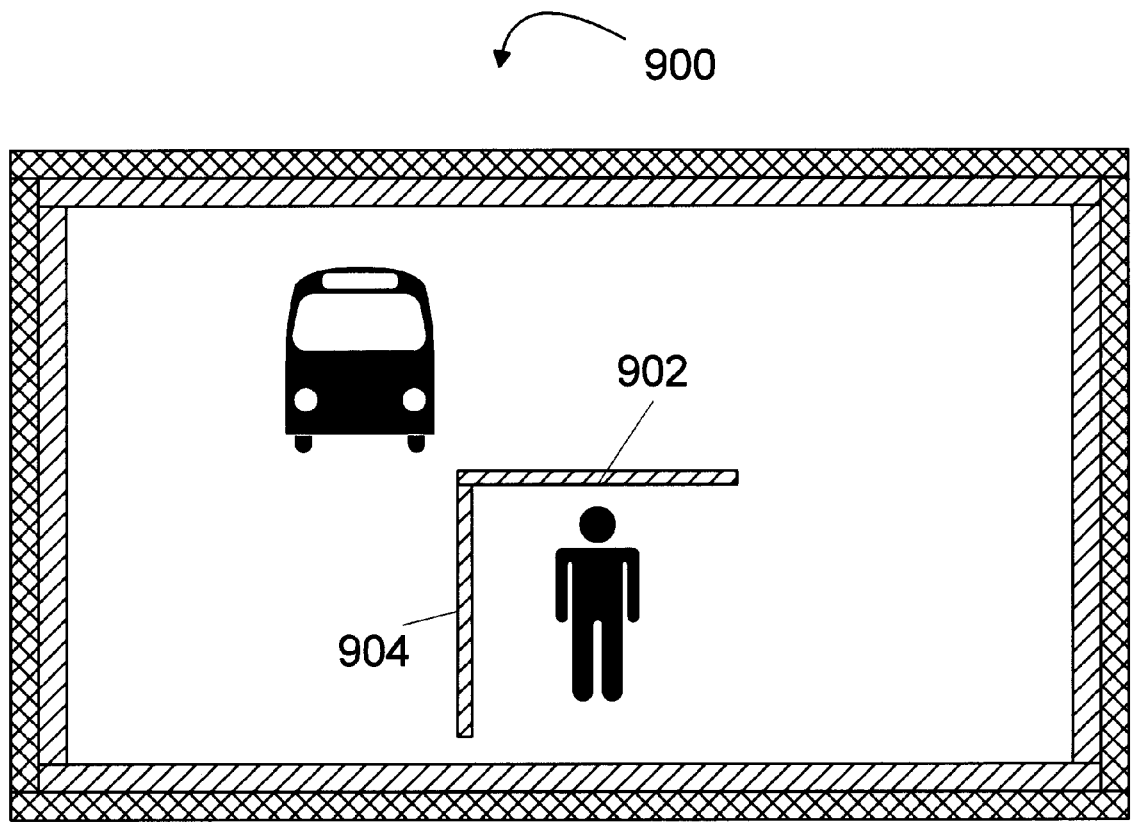
FIG. 9 illustrates a reduced resolution decoded video frame generated from the application of the motion vector illustrated in FIG. 7 to the reduced resolution reference frame illustrated in FIG. 8.

As illustrated in FIG. 8, the block of reference pixels specified by motion vector 702 will include a row of darker, e.g., gray, pixels along the left and top edge of the pixel block. The use of these pixels when decoding a full resolution encoded version of frame 600, using a reduced resolution decoder which downsamples by a factor of two in the vertical and horizontal directions, will result in the frame 900 illustrated in FIG. 9. Note that the frame 900 is half the resolution of the frame 600. Also note however, the significant and noticeable prediction errors in the form of the darker bars 902, 904 located on the top and left sides of the image of the man. Note that the prediction errors which produced the unsightly darker bars 902, 904 are the result of the use of a downsampling video decoder on an image having high contrast horizontal and vertical edges in conjunction with motion vectors which referenced pixels bordering the high contrast vertical and horizontal edges. Note also that these prediction errors are a function of the failure of the downsampling grid to be aligned with the edge of the black pixel border.

Figure 10:
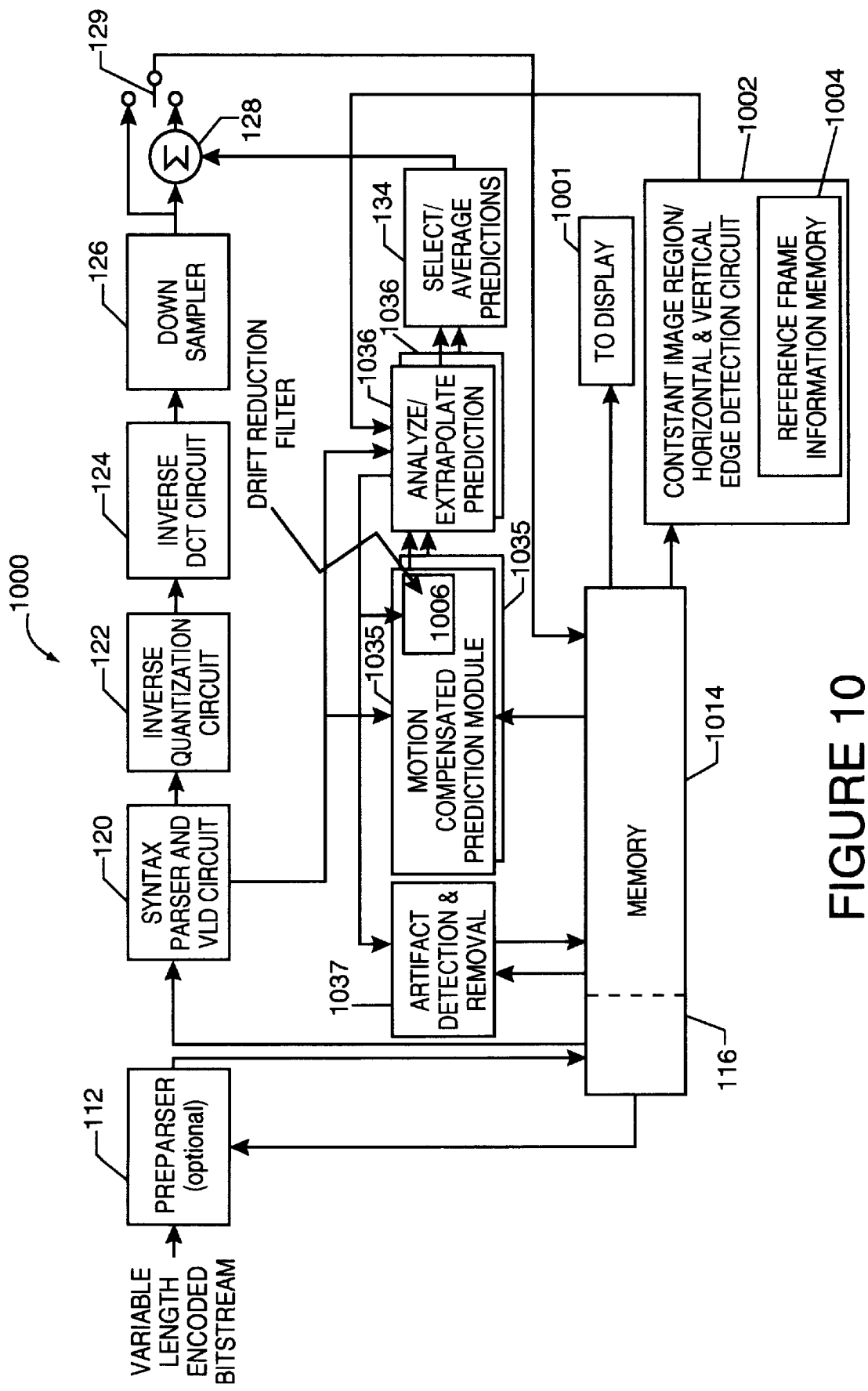
FIG. 10 illustrates a reduced resolution decoder implemented in accordance with an exemplary embodiment of the present invention.

Referring now to FIG. 10, there is illustrated a reduced resolution decoder 1000 implemented in accordance with one exemplary embodiment of the present invention. The decoder 1000 includes a large amount of circuitry which is the same as, or similar to, that of the known decoder 100 of FIG. 1. Such circuitry is identified in FIGS. 1 and 10 using the same reference numbers. For the purposes of brevity, the elements of the decoder 1000 which are the same as or similar to those of the known decoder 100 will not be described again in detail.

The reduced resolution decoder 1000 includes an optional preparser 112, a coded data buffer 112, a syntax parser and VLD circuit 120, an inverse quantization circuit 122, an inverse discrete cosine transform (IDCT) circuit 124, a downsampler 126, a summer 128, a switch 129, and a frame memory 114. In addition, the decoder 1000 includes an artifact detection and removal circuit 1037, a pair of motion compensated prediction modules 1035 which include controllable drift reduction filters 1006, a pair of analyze/extrapolate prediction circuits 1036 in addition to a select average predictions circuit 134 and a constant image region/horizontal & vertical edge detection circuit 1002.

The optional preparser 112 receives the encoded digital video data, e.g., an encoded digital HDTV signal, to be decoded and selectively discards portions of the received data. The output of the preparser 112 is coupled to the coded data buffer 116 which, in turn has an output coupled to the input of the syntax parser and VLD circuit 120. If the preparser 112 is not present, then the encoded digital video data is directly coupled to the coded data buffer 116. An output of the syntax parser and VLD circuit 120 is coupled to the input of an inverse quantization circuit 122. The inverse quantization circuit 122, in turn, is coupled to an IDCT circuit 124. The IDCT circuit 124 outputs decoded video data which is downsampled, e.g., in both the horizontal and vertical directions by the downsampler 126. The output of the downsampler 126 is coupled to the first input of the switch 129 and to a first input of the summer 128.

The summer 128 is used when decoding predicted frames, e.g., inter-coded frames. A second input of the summer 128 is coupled to the output of the select/average predictions circuit 134 for receiving video data generated through the use of one or more motion vectors and one or more reference frames obtained from the memory 114. The output of the summer 128 is decoded video data which represents the predicted frame being decoded. The decoded video data output by the summer 128 includes the combination of decoded intra-coded data included in an encoded predicted frame and the video data obtained through the use of one or more motion vectors and previously downsampled reference frame data.

Because the summer 128 outputs decoded video data corresponding to frames generated through the use of motion vectors, the output video data may include prediction errors of the type discussed above which sometimes occur in downsampling decoders depending on reference scene (frame) content and the image areas of one or more reference frames used by motion vectors. The output of the summer 128 is coupled to a second input of the switch 129.

The switch 129, in turn, has an output coupled to an input of the frame memory 114. The switch 129 is operated to output the intra-coded video data output by the downsampling circuit 126 when an intra-coded frame is being decoded, and to output the predicted frame image data output by the select/average predictions module 134 when a predicted frame is being decoded. The data output by the switch 129 is stored in the reference memory 114. The decoded frames stored in the memory 114 are stored for use as reference frames and are also output to a display device 1001, e.g., picture tube of a television set, for display. Stored predicted frames may be processed by the artifact detection and removal circuit 1037 to reduce the effect of prediction errors prior to being used as reference frame data or being displayed.

The decoder 1000 includes new and novel elements to detect the occurrence of prediction errors which occur in reduced resolution decoders and to reduce the effect of such errors. The new and novel circuitry of the decoder 1000 includes the constant image region/horizontal & vertical edge detection circuit 1002, the pair of analyze/extrapolate prediction modules 1036 which perform motion vector analysis, prediction analysis and selective extrapolation functions, the artifact detection and removal circuit 1037 and the controllable drift reduction filters 1006.

The drift reduction filters 1006 include known filter kernels which are used to minimize the effect of drift resulting from the use of predictions by performing a filtering operation on the video data generated using a prediction.

The detection circuit 1002 of the present invention has a reference frame data input coupled to the output of the frame memory 1014. As will be discussed below, the detection circuit 1002 is used to detect scene conditions in stored frames, e.g., constant image regions and/or horizontal and vertical edges, which can cause prediction errors in reduced resolution decoders. An output of the detection circuit 1002 is coupled to an input of the analyze/extrapolate prediction circuit 1036 which also receives as input signals the video data generated by the prediction modules 1036. In this manner, the analyze/extrapolate prediction circuits 1036 are supplied with the scene condition information which is detected by the detection circuit 1002. The detection circuit 1002 includes a reference frame information memory 1004 for storing results of the detection operations performed by the detection circuit 1002.

Each one of the pair of analyze/extrapolate prediction circuits 1036 is responsible for processing the output of a different one of the motion compensated prediction modules 1035 prior to the prediction data being supplied to the select/average predictions circuit 134. The circuits 1036 are responsible for identifying prediction errors which are likely to cause a significant degradation in image quality and to perform processing operations in order to reduce the effect of such errors. In one embodiment the modules 1036 control the prediction filter 1006 of the corresponding motion compensated prediction modules 1025 to use unimodal filter kernels on macroblocks which have been identified as candidates for picture modification by the analyze/extrapolate prediction module 1036.

The artifact detection and removal circuit 1037 is responsible for processing frames stored in the memory 1014 to reduce the effect of prediction errors, e.g., prediction errors resulting from the application of motion vectors encoded for use with full resolution reference data being applied to reduced resolution reference data. The artifact detection and removal circuit 1037 receives frame data for processing from the frame memory 1014 and information about prediction errors from the analyze/extrapolate prediction circuit 1036. After processing of the frame data to reduce or eliminate the effect of detected prediction errors, the processed frame data is stored in the reference frame memory 1014 in the place of the unprocessed data. Accordingly, at least in one embodiment, the data representing predicted frames is processed by the artifact detection and removal circuit 1037 prior to being used as reference frame data or being output to a display device 1001.

Operation of the constant image region/horizontal & vertical edge detection circuit 1002 will now be described in detail. The detection circuit 1002 operates to detect rectangular blocks of adjacent pixels within a frame that have the same or substantially the same intensity, e.g., are represented using the same or similar luminance values. These types of blocks, especially when large in size in either the horizontal or vertical directions, e.g., extending ⅓ or more the length of the frame in either direction, will have long horizontal or vertical edges associated with them. As discussed above these edges can result in prediction errors if the edges are not aligned with the downsampling grid applied by a reduced resolution decoder.

In one embodiment, to detect constant image blocks, rows of pixels are examined on a row by row basis. The mean and deviation of the luminance values for the row of pixels being evaluated is determined. If a row includes pixels which all have the same value or almost the same value, there will be very little deviation from the calculated mean for the row. In one embodiment, if the sample standard deviation in pixel luminance values is less than 5 for a row, the row is said to constitute a constant block region. If an adjacent row is also found to constitute a constant block region applying the same analysis technique, its mean is compared to the mean of the preceding row of pixels which was analyzed. If the difference between the means for two adjacent rows that constitute constant block regions are within a preselected value, then the adjacent rows are determined to be part of the same constant block region. The preselected value may be selected to represent, e.g., 3% of the overall range of possible pixel luminance values. If the difference between the means of two adjacent constant image regions are found to exceed the preselected difference value, the two rows are determined to correspond to different constant block regions.

Figure 11A:
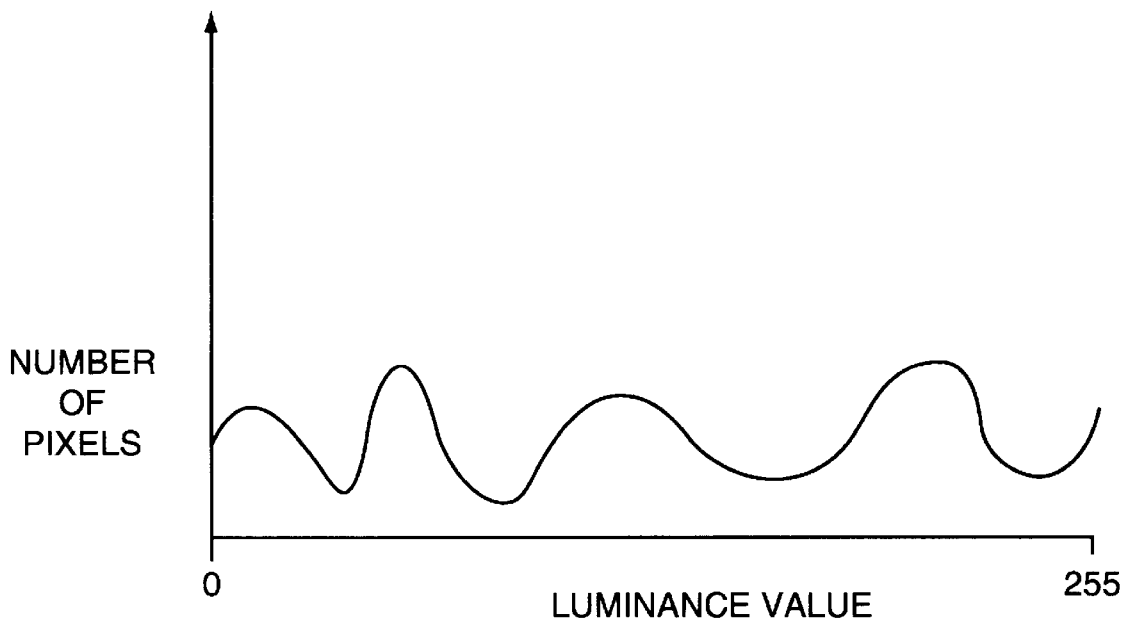
FIG. 11A illustrates a representative plot obtained by plotting the luminance values for each pixel in a row or column of pixels on a scale of luminance values from 0 to 255.

Referring now to FIG. 11A, there is illustrated a representative plot of pixel luminance values for a randomly selected row of pixels of a normal, e.g., non-letterbox or non-bordered, image. Note that the row of pixel values varies over the entire range of possible pixel luminance values extending from 0 to 255 with some values being slightly more common then others depending on the image being displayed. The mean of such a row of pixel values may be, e.g., 120 with a very high standard deviation, e.g., 50, from this mean.

Figure 11B:
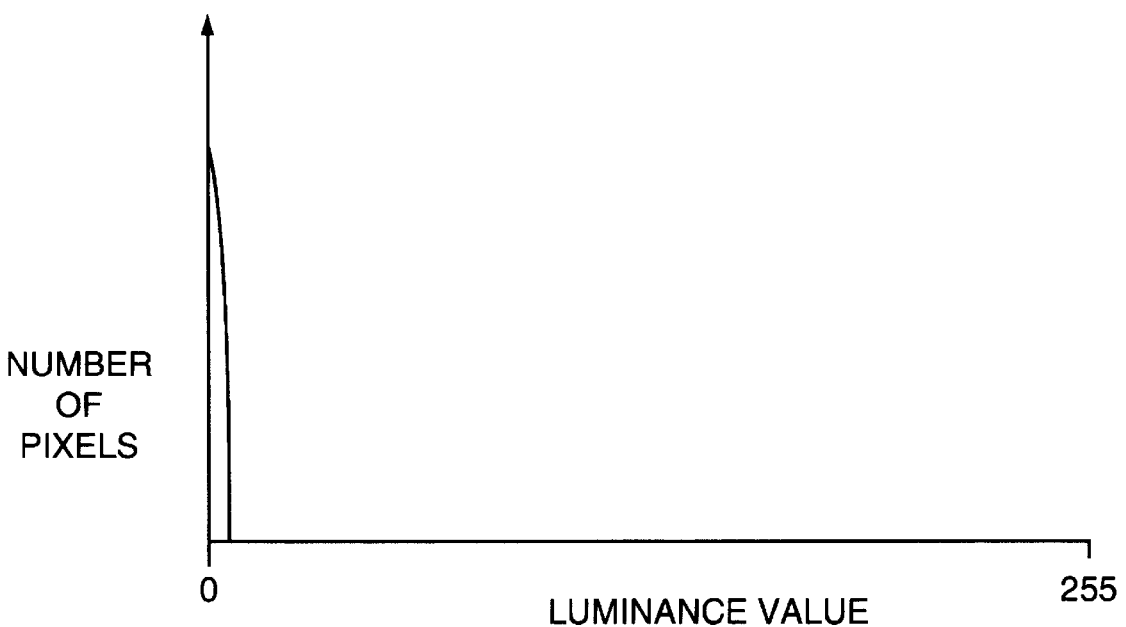
FIGS. 11B is a representative plot of a row or column of pixel values obtained from an all black or nearly all black row or column of pixels.

FIG. 11B illustrates the type of plot that can result when the luminance values for a row of pixels taken from a black border of an image is plotted. Note that in FIG. 11B almost all of the pixel values have a value of 0 and that there will be very little deviation from the mean, e.g., a sample standard deviation of 0.5. The difference between the mean and deviation characteristics of the luminance values of rows of varying pixel intensity, and relatively constant pixel intensity, make the above constant block detection method effective.

The above described method of detecting constant block regions by examining luminance values in rows of pixels can also be applied to columns of pixels to detect, e.g., black vertical border regions.

The statistical analysis described above, can be applied on the basis of entire rows and columns or on sub-intervals thereof.

In one particular embodiment, an estimate of the location and spread of the pixel luminance intensity probability density function (PDF), e.g., the mean and standard deviation discussed above, is computed for analysis on the basis of row, columns or sub-intervals thereof.

A "constant block region" is determined to exist in such an embodiment where there are one or more adjacent segments of pixels with a very small spread in values, e.g., below a preselected threshold, and whose sample PDF locations are all near each other. That is, for all pairs of segments in a particular constant region, the absolute difference between the mean estimates for the two segments in a pair of segments is below a set threshold.

Information on identified constant block regions is stored, in accordance with the present invention, in the reference frame information memory 1004.

In one embodiment each frame generated by a decoding operation is fully analyzed for constant block regions by the detection circuit 1002 and information regarding each identified constant block region is stored in the memory 1004. In such an embodiment, the reference frame information memory 1004 includes constant block region information for each frame stored in the reference frame memory 114.

The processing requirements for detecting constant block regions in frames and the storage requirements for storing the result of such detection operations can be considerably reduced if the goal of such operations is simplified to finding constant block regions which repeatedly occur in multiple frames. As discussed above, letterbox formatting and video encoding operations that result in black pixel borders around images normally result in borders that occur in the same location over several hundreds and even thousands of frames. Accordingly, it is reasonable, when locating these constant images regions, to perform the constant image region analysis over multiple frames and thus spread the processing over multiple frame times.

When looking for constant image regions which occur over multiple frames, the same row and column pixel analysis techniques discussed alone are applied to multiple frames. However, in such an embodiment, only a portion of each frame is analyzed for constant image regions, e.g., with an adjacent portion being analyzed in the next frame. Only when the analysis of multiple frames repeatedly results in the detection of the same constant image regions, are the detected constant image regions declared present in the frames being decoded. In such an embodiment, the reference frame information memory 1004 is used to store one set of declared constant image regions which is considered pertinent to all stored reference frames. In addition, the memory 1004 is used to store temporary constant image region detection results associated with portions of different frames. These temporary results are used to periodically update the declared constant image region information, e.g., after a preselected number of frame times during which the temporary results are confirmed or rejected through the analysis of multiple frames. By periodically updating the declared constant image region information stored in the information memory 1004, changes in image borders or letterboxing which occur over time are reflected in the declared constant image region information stored in the information memory 1004.

Constant block regions, identified in the above described manner, can be considered to be likely to cause significant picture degradation when used as prediction references assuming the boundaries are not aligned with the downsampling grid used by a downsampling decoder.

The relative likelihood of a particular detected constant block region to cause degradation through prediction errors can be, and in at least one embodiment is, assessed by examining the magnitude of the pixel difference measured across the boundaries of the detected regions. Those boundaries with "strong" edges, e.g., relatively large differences in pixel luminance values, are more likely to result image degradation than "weak" edges. Edge strength can be estimated in many ways, e.g., by summing the absolute differences of pairs of pixels on either side of the boundary, along the length of the boundary. "Strong" edges can be determined by comparing the edge strength as described above, to a pre-selected threshold. Information on the strength of edges of identified constant block regions can be stored in the information memory 1004 along with the data identifying the regions for use by the MCP modules 1035.

In addition to the above described techniques of identifying constant block regions, there are many other methods which can be used to identify the existence and location of constant block regions and corresponding horizontal and vertical edges in video frames.

As discussed above, one potentially common source of constant block regions is the practice of letterboxing, whereby the active portion of the picture does not completely fill the coded pixel array. This practice generally involves coding black bars at the top and bottom of each video frame as illustrated in FIG. 2. In one embodiment, the detection circuit 1002 obtains information on letterboxing by examining the transmitted information on vertical display size. In still other embodiments the detection circuit 1002 specifically targets the detection methods described above for identifying the existence and extent of letterbox borders to those bitstreams that code pictures at the standard film rate of 24 frame per second which could be suggestive of the fact that the images being processed correspond to images originally produced for display as film and not digital video.

The above discussion has focused on methods and apparatus for detecting scene conditions, e.g., long horizontal and/or vertical high contrast edges, in reference frames that can cause annoying prediction errors when used by a reduced resolution decoder in making motion compensated predictions. However, it is to be noted that the mere existence of such edges in a reference frame does not necessarily mean that significant prediction errors will result at decoding time if the frame is used as a reference frame. Edge strength, as discussed above, is one factor which affects the actual occurrence of significant prediction errors.

One feature of the present invention is directed to detecting when significant prediction errors are likely to occur during reconstruction of a predicted frame that is being decoded. Because, in MPEG video processing, frame reconstruction during decoding is frequently performed on a macroblock basis, the identification of the probable occurrence of significant prediction errors is performed in one embodiment by the analyze/extrapolate prediction modules 1036 on a macroblock by macroblock basis. In addition to detecting significant prediction errors on a macroblock basis, steps to remediate prediction errors may also be performed on a macroblock basis.

Various steps which are performed, e.g., by each of the analyze/extrapolate prediction modules 1036, to detect significant prediction errors that are likely to occur include motion vector examination and prediction analysis.

In accordance with the present invention, motion vector examination involves determining whether the vertical and/or horizontal components of a motion vector used in a prediction are integer multiples of the vertical and horizontal downsampling ratios, respectively, used by the downsampling decoder performing the decoding operation. Examined motion vector components that are not integer multiples of the corresponding downsampling ratios indicate that the macroblock being reconstructed using the examined motion vector may be "at risk" for prediction errors. Such macroblocks are classified in one embodiment as being "low risk" for prediction errors if no other risk factors exist.

If any of the reference pixels to be used in creating a prediction for an at risk macroblock lies adjacent to a border of a constant block region, as defined above, then the risk of a prediction error is considered even greater, e.g., a moderate risk. Macroblocks where the reference pixels lie completely inside or outside of a detected constant block region, but include pixels at or very near the border of a detected constant block region within the reference frame being used to form the prediction, are considered to be at still greater risk of a prediction error, e.g., at a high risk.

Thus, by performing motion vector analysis in the above described manner, the analyze/extrapolate prediction modules 1036 of the present invention assign different degrees of prediction error risk to macroblocks being reconstructed using motion vectors. The processing performed on a macroblock to minimize the effect of prediction errors in accordance with different embodiments of the present invention, if any, is a function of the determined risk of a prediction error found to exist for a given macroblock.

As discussed above, prediction analysis is another step performed in assessing the risk of a significant prediction error associated with a macroblock being reconstructed. As part of the prediction analysis step of the present invention, a prediction is formed, in the conventional manner, according to one or more received motion vectors. For those macroblocks that are considered to be at moderate or high risk for prediction errors, the performed prediction is analyzed, to further determine whether significant image degradation is likely to occur. This determination, in one embodiment, is made by looking for strong edges at the boundary of the predicted macroblock whose pixels were primarily determined by the pixel values at a boundary of a detected constant block region of the reference frame used to form the prediction. Detection of a strong edge, e.g., an average difference in pixel luminance values across the edge of 30% or more, would be indicative of a significant prediction error.

In some embodiments, reconstructed macroblocks at moderate or high risk are analyzed to detect artifacts in the context of surrounding pixels which were previously reconstructed as part of the frame decoding operation. Note that frames are normally decoded from top to bottom and from left to right. Thus the analysis of the edges of reconstructed macroblocks on a macroblock by macroblock basis would generally be limited to the top and left macroblock edges. Alternatively such analysis can be performed after complete reconstruction of an entire frame, thereby permitting all four macroblock edges to be considered.

Figure 13:
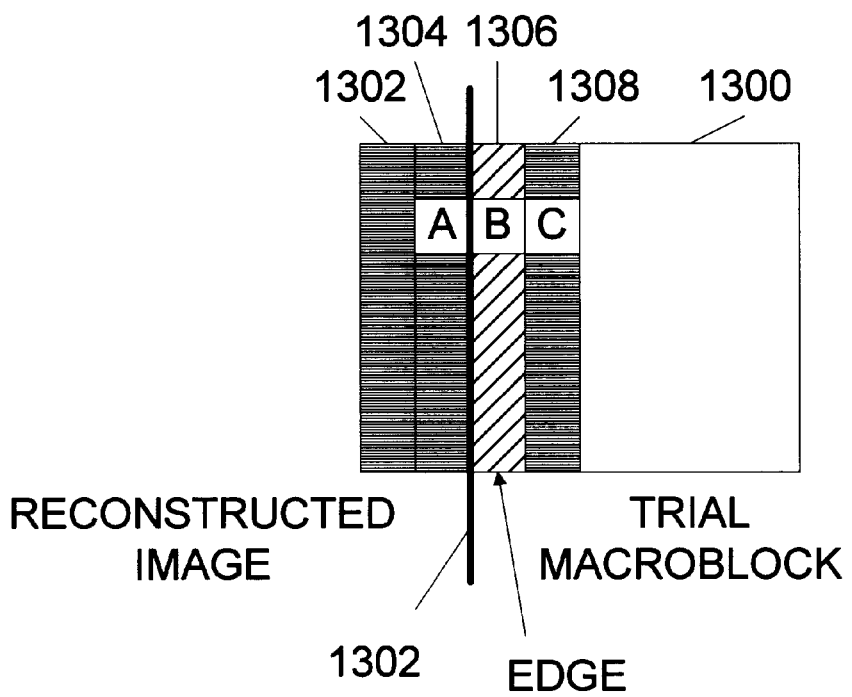
FIG. 13 illustrates a reconstructed macroblock in the context of a reconstructed portion of an image.

FIG. 13 illustrates a representative partial reconstruction of an image as part of a macroblock reconstruction operation. Edge strength at the reconstructed boundaries 1302 of the macroblock being considered are measured and analyzed. A strong edge at the macroblock boundary is determined to be indicative of a reconstruction artifact and the macroblock will be targeted for artifact removal. However, if the reconstruction results in the detection of small or weak boundaries, the macroblock which was previously classified as being at risk for a significant prediction error will be reclassified as being at a small or insignificant risk of a prediction error. Accordingly, the optional artifact detection process offers a way of further refining the identification of macroblocks at risk for significant prediction errors in a downsampling decoder.

Once a macroblock has been classified according to its risk for a significant prediction error, a determination can be made as to whether one or more processing operations should be performed on the classified macroblock in order to minimize or eliminate the occurrence of the expected prediction error. While various filtering and image processing operations discussed below are intended to minimize the effect of prediction errors, they may have a negative impact if applied to macroblocks which are not likely to suffer significant degradation in terms of quality due to such errors or in which prediction errors are unlikely. For this reason, in one embodiment the application of the prediction error minimization processing operations discussed below are limited to macroblocks which have been classified as being at a significant (high) risk for a prediction error, e.g., classified using the above discussed classification techniques.

Figure 12A:
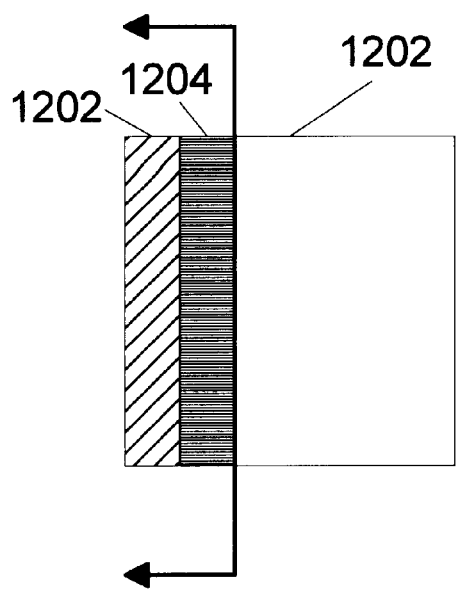
FIG. 12A illustrates an extrapolation method of the present invention applied to a macroblock.
Figure 12B:
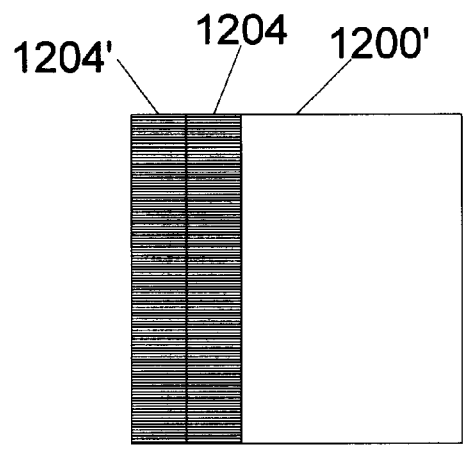
FIG. 12B illustrates a macroblock resulting from the extrapolation method illustrated in FIG. 12A.

For macroblocks that have been classified as being at significant risk for prediction errors, if a strong edge is detected at the boundary of the macroblock being predicted, in one embodiment the strong edge is removed by extrapolating from the adjacent row of pixels within the macroblock for horizontal edges and the adjacent column of pixels within the macroblock in the case of vertical edges. The extrapolation operation is performed by the analyze/extrapolate prediction module 1036. The extrapolated prediction, e.g., the prediction with the extrapolated row or column of pixels at the edge, is then used to reconstruct the macroblock in the normal fashion. Use of the extrapolation technique of the present invention is illustrated in FIGS. 12A and 12B. FIG. 12A illustrates a predicted macroblock with a row of pixels 1202 which have been determined to represent a strong edge corresponding to a prediction error. FIG. 12B illustrates the macroblock 1200' produced by applying the extrapolation process of the present invention to reduce the strength of the edge represented by the row of pixels 1202. Note that in FIG. 12B the edge row of pixels 1202 has been replaced with a copy 1204' of the pixels in row 1204 thereby reducing the edge strength of the processed macroblock 1200'.

The use of filtering performed by the artifact detection and removal circuit 1037 offers an alternative method, to the extrapolation process discussed above, for reducing the effect of prediction errors. The artifact detection and removal circuit 1037 has access to completely reconstructed frames stored in the frame memory 1014 in addition to information regarding the location and provable occurrence of significant prediction errors in a reconstructed frame obtained from the analyzed/extrapolate prediction module 1036. In an embodiment where an artifact detection and removal circuit 1037 is used, the extrapolation feature of the analyze/extrapolate prediction circuit 1036 may be omitted resulting in a simpler analysis circuit 1036' which may be used instead of the circuit 1036.

FIG. 13 illustrates the case where a reconstructed macroblock is targeted for artifact removal. To the left of line 1301 is the reconstructed image including two columns of pixels 1302, 1304. To the right of line 1301 is the column of pixels 1306 representing the detected edge and an adjacent column of pixels 1308. In the embodiment of the present invention where a reconstructed macroblock is targeted for artifact removal the edge is reduced or eliminated by the use of some form of impulse rejection, e.g., the use of median filtering across the edge implemented using one or more filters included in the artifact detection and removal circuit 1037. In one such embodiment, pixel values obtained from rows or columns of pixels perpendicular to an edge identified by the module 1036 or 1036' are examined by the circuit 1037 to determine the median pixel value. The pixel values for the pixel corresponding to the determined median is then used to replace the pixel value at the edge of the macroblock being processed.

This operation, performed by the circuit 1037, may be expressed as follows:

```
for each pixel in the column of pixels
    1304, 1306, 1308 do:
    if |B(I) − med[A(i) + B(i) + C(i)]| > T
        set B(i) = median[A(i) + B(i) + C(i)]
    else
        set B(i) = B(i)
``` where A(i), B(i), and C(i) represent the values of the $i^{th}$ pixel in each of the respective corresponding columns 1304, 1306, 1308 and where T is a threshold luminance value which must be exceeded before the pixel value at the edge will be replaced.

An alternative filtering approach which, in various embodiments is implemented by the artifact detection and removal circuit 1037 involves replacing the edge pixel with the average value of the two pixels adjacent the edge pixel.

Such an edge filtering operation may be expressed as follows:

```
for each pixel in the column of pixels
    1304, 1306, 1308 do:
    if |B(i) − med[A(i) + B(i) + C(i)]| > T
        set B(i) = [A(i) + C(i)/2]
    else
        set B(i) = B(i)
``` where the values A(i), B(i), and C(i) and T are as discussed above.

When the above discussed edge filtering techniques are used by a downsampling decoder, it is desirable that the circuitry, e.g., the analysis circuitry 1036 used to control the application of edge filtering by the artifact detection and removal circuit 1037, includes the capability of controlling the filter kernels used by the drift reduction filters 1006 so that the filter kernels are forced to be unimodal, e.g., having one local maximum for macroblocks whose motion vectors cause them to be classified as being at moderate or high risk of significant prediction errors and therefore subject to processing by the artifact detection and removal circuit 1037. This filtering constraint, imposed in accordance with the present invention, insures that edges will not result in "ringing" in the predictions and thus complicating the application of the above discussed methods of detecting and removing the degradation due to constant block region boundaries in downsampled reference frames.

An alternative to the above discussed prediction error detection and reduction techniques is the use of a decoder which applies differing degrees of downsampling to various portions of frames. Such a decoder allows macroblocks that include boundaries adjacent constant block regions to be decoded at relatively high resolution, e.g., full resolution, in the axis perpendicular the horizontal or vertical boundary of interest. By maintaining the high resolution of a reference frame at areas such as long horizontal and/or vertical edges which can lead to prediction errors if downsampled, prediction errors due to downsampling can be reduced or eliminated. In one decoder embodiment, those macroblocks that include a horizontal boundary with a constant block region are decoded with full vertical resolution. The decoded macroblocks are then stored, e.g., in the frame memory 114, at the resolution at which they were decoded. In this way, predictions made from reference pixels located at or near the edges of constant block regions will contain a much smaller degree of prediction error than they would contain if the reference frame had been entirely downsampled, since a high degree of resolution at the edge is maintained in the frame memory 114. In such an embodiment, the majority of the macroblocks which form a frame will still be decoded and stored at a reduced resolution, while a minority of the macroblocks will be decoded at a higher resolution along at least one of the two sampling axes.

In one particular embodiment, macroblocks are downsampled in the direction parallel to the horizontal or vertical edge which they border but not in the direction perpendicular to the edge. In this manner, full resolution is maintained in only one dimension. This approach to controlled downsampling requires less memory than when macroblocks located along horizontal or vertical edges are stored at full resolution, e.g., in both the horizontal and vertical directions.

Figure 14:
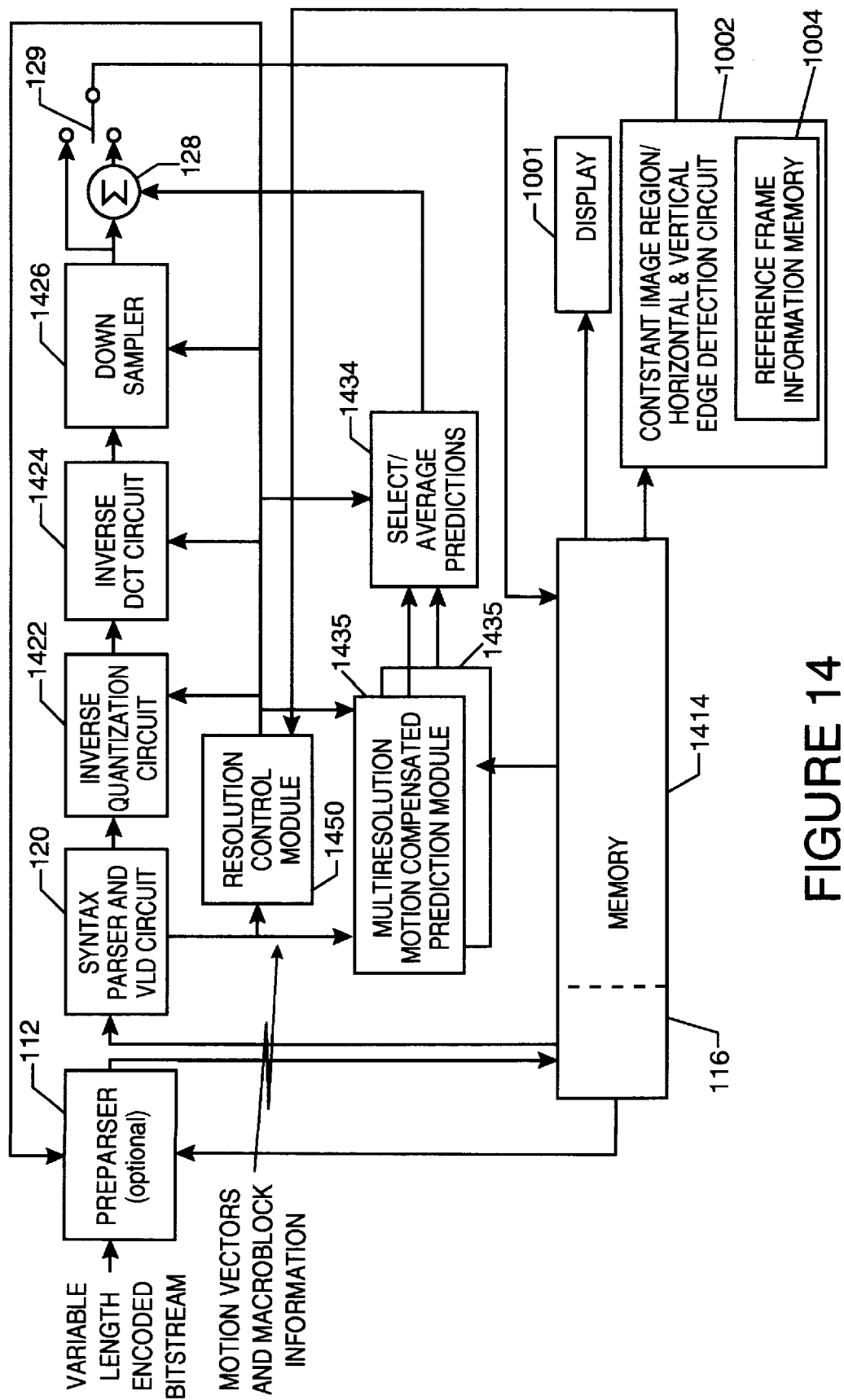
FIG. 14 illustrates a hybrid downsampling decoder implemented in accordance with an embodiment of the present invention.

A downsampling decoder capable of selectively applying downsampling to a frame during decoding, referred to herein as a "hybrid downsampling decoder", is illustrated in FIG. 14. In a hybrid downsampling decoder such as the decoder 1400, the majority of the macroblocks representing an image are normally decoded at a reduced resolution since most macroblocks will not, under normal conditions, border a constant block region.

Accordingly, a hybrid downsampling decoder such as the decoder 1400 can be implemented using far less memory than a full resolution decoder since a major portion of each reference frame will be stored in a reduced resolution, e.g., downsampled, format. Thus, the hybrid downsampling decoder of the present invention enjoys much of the reduced memory advantages of downsampling decoders. In addition, hybrid downsampling decoders can provide significantly improved image quality over conventional downsampling decoders that do not preserve the full resolution of at least some portions of the frames used for reference purposes.

In one particular embodiment, the hybrid decoder 1400 not only decodes macroblocks located at constant block boundaries of reference frames at full resolution but also decodes areas within constant block regions at a greater degree of reduced resolution than other areas of the image. Thus, in such an embodiment, constant block regions which are, by definition, relatively consistent, are represented using relatively little data compared to other image portions. The memory savings associated with increased downsampling of constant block regions helps to offset the increased memory required to store information representing macroblocks which border a constant block region at full resolution. In another embodiment, macroblocks that are decoded at full resolution along one axis are decoded with a greater reduction in resolution along the other axis, compared with the resolution of the majority of the macroblocks decoded in the picture.

Note that the hybrid decoder 1400 bears many similarities to that of the decoders illustrated in FIGS. 1 and 10. Like numbered elements in FIGS. 1, 10, and 14 refer to the same or similar elements and therefore will not be described again in detail.

The hybrid decoder 1400 includes an optional preparser 112, a coded data buffer 116, a syntax parser, a VLD circuit 120, and constant image region/horizontal & vertical edge detection circuit 1002 and a reference frame memory 1414. In addition, it includes a resolution control module 1450. The resolution module 1450 has a motion vector information input coupled to a corresponding output of the syntax parser and VLD circuit 120 and a constant image region/edge information input coupled the output of the constant image region/horizontal & vertical edge detection circuit 1002. The resolution module 1450, determines as a function of constant image region and/or edge information output by the detection circuit 1002, which portions, e.g., macroblocks, of a received image are to be decoded and stored at full resolution and which are to be stored at a reduced resolution. The resolution control signal may also be generated as a function of frame type and/or motion vector information supplied by the syntax parser and VLD circuit 120 to the resolution control module 1450 and motion compensated prediction modules 1435. For example, in the case of bi-directionally coded frames which will not be used as reference frames, the resolution control module will, in one embodiment, control the downsampler 1426 to downsample the entire frame. The downsampling is performed over the entire frame with the knowledge that the frame will not be used for reference purposes and therefore will not give rise to the type or prediction errors discussed at length above.

When processing frames which may be used as reference frames, e.g., I and P frames, the information about constant image regions and horizontal/vertical edges is used to determine which selected portions of an image should be downsampled and stored in a reduced resolution form.

In embodiments where the inverse quantization circuits 1422 and inverse DCT circuits 1424 are controlled to operate differently when processing data corresponding to a portion of the image to be stored at a reduced resolution, the resolution control signal generated by the resolution control module 1450 is supplied to the circuits 1422, 1424 in addition to the controllable downsampler 1426. The resolution control signal is also supplied to the multi-resolution motion compensated prediction modules 1435 and select/average predictions circuit 1434 so that these circuits are informed of which portions of an image are to be processed and maintained (stored) at high, e.g., full resolution, and which portions should be processed and stored at one or more different reduced resolutions.

In response to the resolution control signal output by the resolution control module 1450, the downsampler 1426 will downsample some portions of an image, e.g., areas within identified constant image regions more than other areas, e.g., image areas located near or adjacent a detected horizontal or vertical edge.

In the FIG. 14 embodiment, a single set of constant block information and edge information which identifies constant block regions repeatedly detected in multiple frames is stored in the reference frame information memory 1004 used for controlling which portions of an image are downsampled and which are stored at a higher resolution along at least one sampling axis.

As discussed above, the resolution control module 1450 receives the constant block information which identifies constant image areas found to occur in multiple frames and uses this information along with the associated edge information to determine which portions of an image should be downsampled and which frame portions should be decoded and stored at increased resolution. In this manner, the resolution control module 1450 insures that macroblocks along a horizontal or vertical edges associated with detected constant image regions are decoded at high resolution, at least in the direction perpendicular to the edge, while will other image areas are decoded at a reduced resolution corresponding to the degree of downsampling applied. The downsampler 1433 is selectively controlled by the resolution control module 1450 to insure that image areas which are to be decoded at full resolution are not downsampled prior to storage in the memory 114.

The reduced resolution decoders of the present invention may be used to decode both high definition television signals at reduced resolution and standard definition digital television signals at full resolution assuming, e.g., that the decoder 1400 disables downsampling when processing SDTV signals.

The decoder apparatus of the present invention have been described primarily in terms of embodiments which are implemented using one or more integrated circuits, e.g., arranged on a printed circuit board. However, it is to be understood that the decoding methods described herein may also be implemented, e.g., as a series of software instructions executed on a general purpose computer, such as multi-media equipped personal computer with a Pentium™ processor.

In addition, while downsampling has been described as the primary method of data reduction, alternative data reduction techniques including, e.g., discarding of selected data and/or data compression techniques may be used in place of downsampling.

What is claimed is:

1. A method of processing encoded video data, comprising the steps of:
receiving encoded video data representing a first image;
performing a decoding operation on the encoded video data to produce a first set of decoded video data representing the first image;
examining the first set of decoded video data to detect the location of constant block regions formed by a plurality of contiguous pixels which have consistent luminance values; and
storing the decoded video data representing the first image.

2. The method of claim 1, wherein the step of performing a decoding operation includes the step of performing a data reduction operation.

3. The method of claim 2, further comprising the steps of:
generating image information which includes information about constant block regions in the first set of decoded video data; and
storing the generated image information.

4. The method of claim 3, wherein the step of examining the first set of decoded image data includes the step of:
identifying the location of detected constant block regions.

5. The method of claim 1, wherein the step of examining the decoded video data to detect the presence and location of constant block regions includes the steps of:
calculating a first mean and a first standard deviation for the luminance values of pixels included in a segment of a first row of pixels; and
determining if the calculated first deviation is below a first preselected threshold value.

6. The method of claim 5, wherein the step of examining the decoded video data further includes the steps of:
calculating a second mean and a second standard deviation for the luminance values of pixels included in a segment of a second row of pixels; and
determining if the calculated second deviation is below a second preselected threshold value.

7. The method of claim 6,
wherein the first and second preselected threshold values are the same, and
wherein the step of examining the first set of decoded video data further includes the steps of:
comparing the first and second means if it is determined that the first and second deviations are below the preselected threshold value.

8. The method of claim 1, further comprising the step of:
receiving encoded video data representing a second image; and
decoding the encoded video data representing the second image as a function of the stored image information and the stored decoded video data representing the first image.

9. The method of claim 8, further comprising the step of:
performing a downsampling operation on the first set of decoded video data prior to storing the first set of decoded video data.

10. The method of claim 9, further comprising the step of:
assessing, as a function of the stored image information, the probability that a predication error which will produce an erroneous vertical or horizontal line in the second decoded image will occur.

11. The method of claim 8, wherein the step of decoding the encoded video data representing the second image generates a second set of decoded video data, the method further comprising the steps of:
performing a downsampling operation on the first set of decoded video data prior to storing the first set of decoded video data;
performing a downsampling operation on at least a portion of the second set of decoded video data; and
storing the second set of decoded video data in a storage device.

12. The method of claim 1, wherein the step of examining the first set of decoded video data includes the step of:
examining display vertical size information included in the received encoded video data representing the first image.

13. The method of claim 3, wherein the step of storing frame information includes the step of:
storing information identifying the location of a detected constant block region.

14. The method of claim 3, wherein the step of storing frame information includes the step of:
storing information identifying the location of an edge of a detected constant block region.

15. A method of processing encoded video data representing a series of frames, comprising the steps of:
receiving encoded video data representing a first frame;
decoding the encoded video data representing the first frame;
analyzing at least a portion of the decoded video data representing the first frame to detect the location of one or more blocks of pixels in the first frame having a consistent intensity;
decoding subsequent video data representing subsequent frames;
analyzing at least a portion of some of the subsequent decoded frames to detect the location of one or more blocks of pixels of consistent intensity in the analyzed subsequent frames; and
comparing the location of blocks of pixels of consistent intensity detected in multiple frames to detect blocks of pixels of consistent intensity which occur in the same location in multiple frames.

16. The method of claim 15, further comprising the step of:
decoding encoded video data including motion vectors representing an additional frame as a function of the location of blocks of pixels of consistent intensity which occur in the same location in multiple frames.

17. The method of claim 16, further comprising the step of:
performing a downsampling operation on at least some of the decoded video data generated by decoding encoded video data; and
storing the downsampled decoded video data for use as reference data.

18. The method of claim 16,
wherein the step of analyzing at least a portion of the decoded video data representing the first frame includes the step of:
analyzing two adjacent rows of pixels to determine if they correspond to a black border.

19. The method of claim 18, wherein the step of decoding encoded video data including motion vectors representing an additional frame includes the steps of:

using the constant block information obtained by comparing the location of blocks of pixels of consistent intensity in previously decoded frames to determine the occurrence of prediction errors during decoding; and performing a prediction error filtering operation on the decoded video data to reduce the
effect of prediction errors whose occurrence has been determined.

20. A reduced resolution decoding method, comprising the steps of:

decoding a first image encoded at a first resolution;

analyzing the decoded first image to detect black borders, having horizontal or vertical edges, included in the decoded first image;

storing a representation of the first image in a memory device at a resolution lower than the first resolution; and decoding a second image encoded at the first resolution, the step of decoding the second image including the step of:

performing a motion compensated prediction operation using the stored representation of the first image as reference data and using information regarding black borders included in the decoded first image.

21. An apparatus for processing digital video, comprising:

an inverse discrete cosine transform circuit for receiving and processing transform coded data video data representing video frames;

a constant image region detection circuit coupled to the inverse discrete cosine transform circuit for analyzing data representing video frames to detect a region within at least one frame having a consistent intensity; and a motion compensated prediction module coupled to the constant image region detection circuit for performing motion compensated prediction operations as a function of a decoded reference frame and data output by the constant image region detection circuit.

22. The apparatus of claim 21, further comprising:

a memory device for storing information identifying the position of a constant image region in the at least one frame.

23. The apparatus of claim 22, further comprising:

a downsampler coupled to an output of the inverse discrete cosine transform circuit for performing a downsampling operation on video data output by the inverse discrete cosine transform circuit.

24. The apparatus of claim 23, wherein the apparatus is a digital television receiver, the apparatus further comprising:

a display device coupled to the memory.

25. A video decoder, comprising:

an inverse discrete cosine transform circuit for receiving and processing transform coded video data representing video frames;

a horizontal edge detection circuit for detecting edges within said video frames;

a controllable data reduction circuit coupled to the inverse discrete cosine transform circuit and to an output of said horizontal edge detection circuit, the controllable data reduction circuit for reducing, as a function of edge information, the amount of data used to represent video frames;

a frame memory coupled to the data reduction device for storing decoded video data representing video frames; and a motion compensated prediction module for performing motion compensated prediction operations coupled to the frame memory.

26. The video decoder circuit of claim 25, wherein the data reduction device is a downsampling circuit; and wherein the video decoder circuit further comprises:
a reference frame information memory coupled to the horizontal edge detection circuit and the motion compensated prediction module for storing horizontal edge information.

27. The method of claim 25, further comprising:

a resolution control module for coupling said output of said horizontal edge detection circuit to said controllable data reduction circuit.

* * * * *